(12) United States Patent
Wang (10) Patent No.: US 9,516,864 B2
(45) Date of Patent: Dec. 13, 2016

(54) STRUCTURE OF PET FECES COLLECTION BAG

(71) Applicant: Yung-Ning Wang, Keelung (TW)

(72) Inventor: Yung-Ning Wang, Keelung (TW)

( * ) Notice: Subject to any disclaimer, the term of this patent is extended or adjusted under 35 U.S.C. 154(b) by 0 days.

(21) Appl. No.: 14/812,228

(22) Filed: Jul. 29, 2015

(65) Prior Publication Data

US 2016/0029600 A1    Feb. 4, 2016

(30) Foreign Application Priority Data

Jul. 29, 2014 (TW) .............................. 103213424 U (51) Int. Cl.
  *A01K 29/00* (2006.01)
  *E01H 1/12* (2006.01)
  *A01K 23/00* (2006.01)

(52) U.S. Cl.
  CPC ........... *A01K 23/005* (2013.01); *E01H 1/1206* (2013.01); *E01H 2001/126* (2013.01)

(58) Field of Classification Search
  CPC ................. A01K 23/005; E01H 1/1206; E01H 2001/126; E01H 2001/122; E01H 2001/1226
  USPC .................................... 294/1.3–1.5; 15/257.4
  See application file for complete search history.

(56) References Cited

U.S. PATENT DOCUMENTS

| | | | | |
|---|---|---|---|---|
| 3,942,831 A | * | 3/1976 | Sosnove | E01H 1/1206 15/257.4 |
| 4,138,153 A | * | 2/1979 | Brown | E01H 1/1206 15/257.1 |
| 4,530,533 A | * | 7/1985 | Dieter | B65B 67/1238 141/316 |
| 4,958,871 A | * | 9/1990 | Hemans | E01H 1/1206 15/257.1 |
| 4,986,587 A | * | 1/1991 | Lozano | E01H 1/1206 15/257.1 |
| 6,030,011 A | * | 2/2000 | Layton | E01H 1/1206 15/257.4 |
| 6,554,334 B2 | * | 4/2003 | Rincon Uribe | E01H 1/1206 15/104.8 |
| 8,201,862 B2 | * | 6/2012 | Langley | A01K 23/005 294/1.3 |

(Continued)

FOREIGN PATENT DOCUMENTS

| | | |
|---|---|---|
| DE | 10 2012 106 504 A1 * | 1/2014 |
| TW | M400205 U | 3/2011 |

*Primary Examiner* — Dean Kramer
(74) *Attorney, Agent, or Firm* — Locke Lord LLP; Tim Tingkang Xia, Esq.

(57) ABSTRACT

A pet feces collection bag comprises a carrier plate, a handle portion, and a bag. The handle portion, formed as a frame structure, is coupled to two corresponding sides of a periphery of the carrier plate and extends outward therefrom thereby defining the carrier plate into a front part having a first predetermined length and a rear part having a second predetermined length along a specific direction, wherein the first predetermined length is smaller than the second predetermined length. The bag is connected to peripheries of the handle portion and the rear part by a predetermined connection manner. The handle portion is operated to rotate around the carrier plate within 360 degrees about a specific axis whereby an opening of the bag is selectively to be opened or closed. The carrier plate and the handle portion are formed as one-piece unit.

16 Claims, 10 Drawing Sheets

(56) References Cited

U.S. PATENT DOCUMENTS

| | | | |
|---|---|---|---|
| 8,544,906 B2* | 10/2013 | Northrop | E01H 1/1206 294/1.4 |
| 8,641,109 B2* | 2/2014 | Ng | E01H 1/1206 294/1.4 |
| 2004/0164568 A1* | 8/2004 | Diehl | A01K 23/005 294/1.4 |
| 2010/0181787 A1* | 7/2010 | Williamson | E01H 1/1206 294/1.3 |
| 2014/0152030 A1* | 6/2014 | Van Halder | E01H 1/1206 294/1.3 |

* cited by examiner

STRUCTURE OF PET FECES COLLECTION BAG

CROSS REFERENCE

This application claims the benefit of Taiwan Patent Application Serial No. 103213424, filed Jul. 29, 2014, the subject matter of which is incorporated herein by reference.

BACKGROUND OF INVENTION

1. Field of the Invention

The present invention relates to a structure of pet feces collection bag and, more particularly, to a pet feces collection bag by which the pet owners can immediately collect the feces of pets easily and conveniently when the pet owners are walking their pets outdoors, and can throw the bag with feces away in an outdoor garbage can without taking it home.

2. Description of the Prior Art

Having pets has gradually become a habit of the modern man for the past few years. The pet owner usually walks his/her pet outdoors; however, it has been become a problem that the pet owner has to clean the feces of pet after defecation. In some countries or region, the government authorities request or even make regulations or rules that the pet owner will be penalized if the pet owner did not clean feces up. Accordingly, the pet owner usually carries tissues or plastic bags for collecting the feces and thereafter brings used tissues or plastic bags back home. However, when it comes to the larger pets that usually have large amount of feces, the pet owners has to use a large amount of tissues for cleaning up the pet feces. Worse still, when the pets have mushy stool rather than stool shaped like a log, it will be more difficult to clean up. If the pet feces are not cleaned up properly, the fecal odor will be incurred due to the residual feces left on the ground while the soiling of the appearance of city can also be occurred. In addition, once the pet defecated on the grass ground, the mushy stool will be more difficult to be cleaned up and the residual feces left on the grass ground will attract flies and mosquitoes thereby inducing more problems about environmental sanitation.

Many companies are aware of the aforementioned issues and provide solutions for overcoming the problem due to the feces of the pets. For example, the Taiwan utility patent No. M400205 provides a device for collecting the pet feces including a handle, a flexible frame, a heat-sealing device, and a power source. The pet owner grasps the handle and uses the power source to provide the electricity to the heat-sealing device for sealing the bag opening contracted by the flexible frame whereby the pet feces can be collected within the bag and completely sealed. Nevertheless, the design of the aforesaid art is heavy such that it is inconvenient to carry it when the pet owners are walking their pets outdoors. Furthermore, an environmental issue may be induced because a battery is necessary to be used as the power source of the device while a structural complexity of the device will increase the manufacturing cost as well.

Accordingly, since the aforesaid conventional art still has drawbacks and inadequate parts, a research and design is needed thereby providing a novel product for collecting the pet feces.

SUMMARY OF THE INVENTION

In view of above, in order to improve the aforesaid problems according to the consideration of various fields such as different body size of pets, different outdoor environments, different types of pet feces, convenience of collection of the pet feces, and manufacturing cost, the present invention provides a structure of pet feces collection bag in response to the above-mentioned considerations such that the pet owner can immediately collect the feces of pets easily and conveniently and the collected feces can be thrown away in an outdoor garbage container without a further treatment.

The present invention provides a structure of pet feces collection bag comprising a carrier plate, a handle, and a bag. The handle is coupled to two corresponding positions respectively on a periphery of the carrier plate and is a frame structure extending outward from the two corresponding positions whereby the carrier plate is defined into a front part and a rear part having a first predetermined length and a second predetermined length along a specific direction, respectively, wherein the first predetermined length is smaller than the second predetermined length. The bag has an opening which is configured to have an opening connected to the handle portion and the rear part of the carrier plate along peripheries of the handle portion and the rear part of the carrier plate by a predetermined connection manner. The handle can be operated through a predetermined action which makes the handle to rotate about a specific axis so that the handle can be rotated around the carrier plate within 360 degrees whereby the opening of the bag can be selectively opened or closed in response to the predetermined action of the handle.

Based on the above-mentioned structure of the pet feces collection bag according to the present invention, in one embodiment, the carrier plate, the handle and the bag are formed as one unit by which the user merely pulls up the handle such that the carrier plate and the handle can rotate toward each other whereby the pet feces can fall into the bag from the carrier plate thereby completing operation of feces collection. One advantage of the structure of the present invention is simple and is easy for mass production, so the manufacturing cost is extremely low such that the single-use disposable is considerable for the user. In addition, since a size of the carrier plate can be designed according to the body size of the pets, the user can choose proper size of device for collecting the pet feces according to the size of their pets which is another advantage that make a great improvement of convenience when users carry and use the collection bag of the present invention.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a structure of pet feces collection bag. In the following description, numerous details corresponding to the aforesaid drawings are set forth in order to provide a thorough understanding of the present invention so that the present invention can be appreciated by one skilled in the art, wherein like numerals refer to the same or the like parts throughout.

Figure 1A:
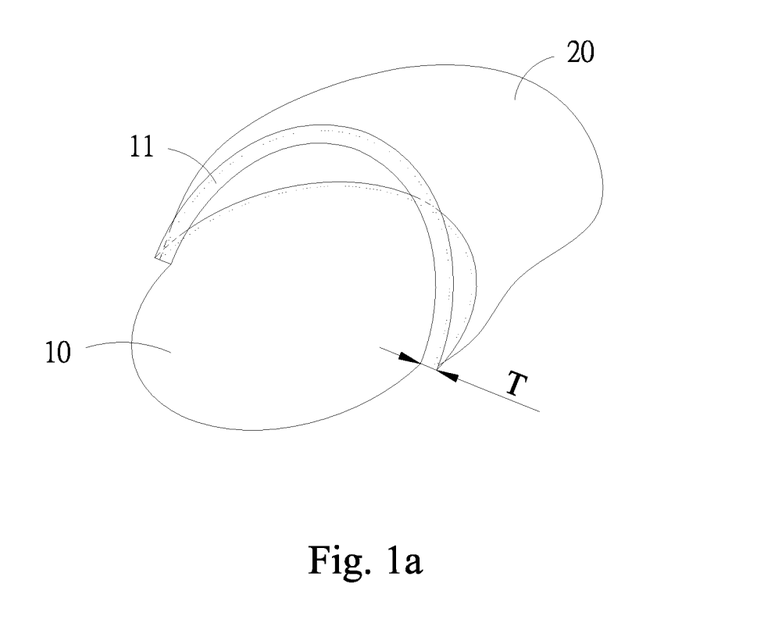
FIG. 1a illustrates one embodiment of a structure of pet feces collection bag according to the present invention.

Please refer to FIG. 1a, which illustrates one embodiment of a structure of pet feces collection bag according to the present invention. The pet feces collection bag comprises a carrier plate 10, a handle portion 11, and a bag 20.

The handle portion 11 is coupled to two specific positions respectively located at two corresponding sides of a periphery of the carrier plate 10. The handle portion 11 is formed as a frame structure and extends outward from the two corresponding sides of the carrier plate 10. The carrier plate 10 has a thickness so that when the feces are collected on the carrier plate 10, the carrier plate 10 has sufficient strength for supporting the weight of feces without large deformation. It is noted that there has no specific limitation on the thickness of the carrier plate 10, and the thickness of the carrier plate 10 can be determined according to material selected to form the carrier plate.

Meanwhile, it is capable of using cheaper paper material adapted in the packaging box field, such as corrugated paper with different layer design, waterproof kraft paper, and non-waterproof kraft paper, or using plastic or green material. In addition, in the present embodiment, the shape of the carrier plate 10 is a near-circular shape. It is noted that, the shape of the carrier plate 10 is not limited to the near-circular shape. For example, in alternative embodiment, the shape of the carrier plate can be, but is not limited to, an elliptical shape, a rectangular shape, a polygonal shape, or a trapezoidal shape. In one embodiment, the carrier plate 10 and the handle portion 11 can be formed as one-piece unit. Alternatively, the carrier plate 10 and the handle portion 11 can be formed as one-piece unit as well as made of the same material.

The bag 20 is an object with one opening which is coupled to the handle portion 11 along a periphery of the handle portion 11 and coupled to the carrier plate 10 along a periphery of a rear part of the carrier plate 10 through a predetermined connection manner. The bag 20 can be a conventional plastic bag, which is made by a material selecting from a group consisting of polyethylene (PE), high density polyethylene (HDPE), low density polyethylene (LDPE), linear low density polyethylene (LLDPE) that is usually applied in plastic wrap, polypropylene (PP), polyvinyl chloride (PVC), ethylene vinyl acetate, (EVA), a mixture of PE and EVA, composition of PE/PP, composition of PE/EVA, composition of PE/PVC, composition of PE/Nylon, composition of PE/PET (polyethylene terephthalate), and composition of PP/PP. Alternatively, the bag 20 can also be a reusable bag. The material for forming the reusable bag can be, but is not limited to, a non-woven fabric, a biodegradable plastic, a photo-degradable plastic, or a chemically degradable plastic. It is noted that the material for making the bag 20 is not limited to the aforesaid materials and it can be determined according to the actual need.

According to the aforesaid description, the predetermined connection manner can be, but is not limited to, a sticking connection, a tying connection, a clip connection, a tying connection, and a nail connection. The sticking connection, for example, can be a way by using hot glue for sticking the rim of the opening of the bag 20 to the handle portion 11 and the rear part of the carrier plate 10. Alternatively, when it comes to a clip connection, the rim of the opening of the bag is clipped to the periphery of the carrier plate 10 and the periphery of the handle portion 11 through clips. In an alternative embodiment, a tying connection can be a way that a plurality of holes are formed along the rim of the opening of the bag whereby a wire is utilized to pass through the holes and tie the rim of the opening to the periphery of the carrier plate 10 and the periphery of the handle portion 11. Alternatively, the nail connection is a way to bind the bag 20, carrier plate 10 and handle portion 11 together by using nail elements, such as staples, to join the rim of the opening of the bag 20 to the periphery of the carrier plate 10 and the periphery of the handle portion 11.

Figure 1B:
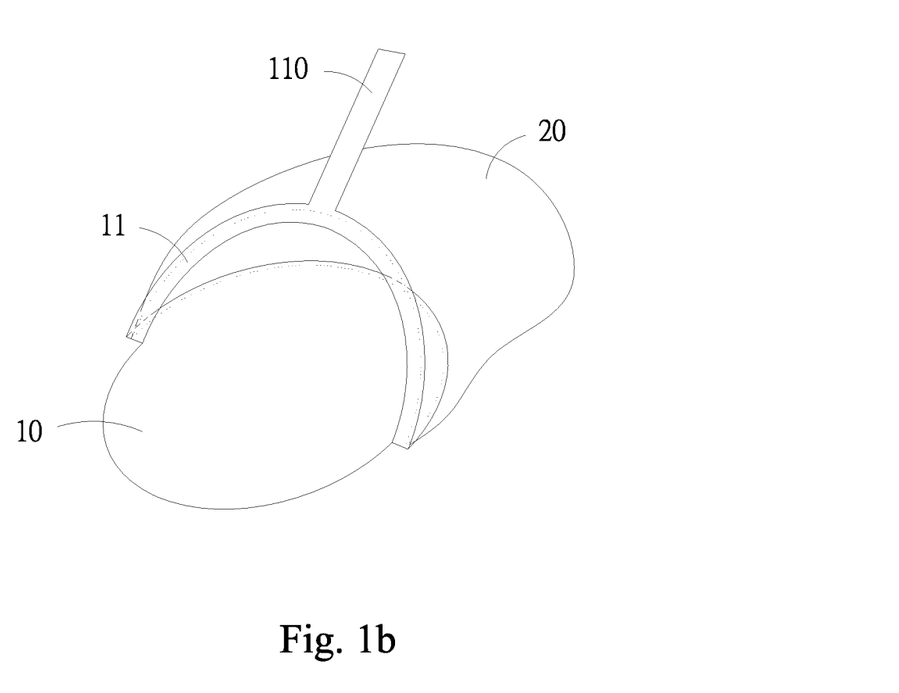
FIG. 1b illustrates another embodiment according to the present invention.
Figure 2A:
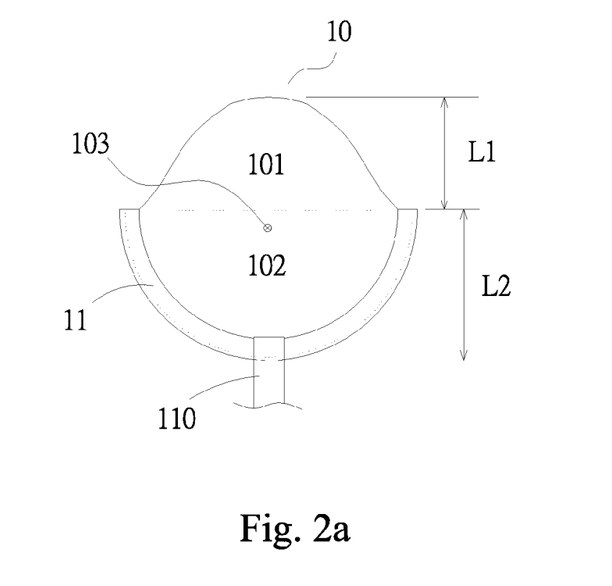
FIGS. 2a-2b illustrates a top view of the opening status and the closing status of the collection bag according to one embodiment of the present invention.
Figure 2B:
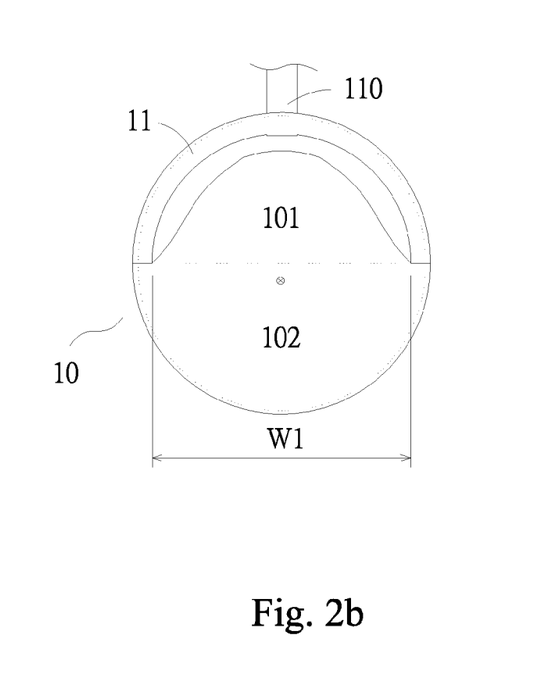

Please refer to FIG. 1b, which illustrates another embodiment according to the present invention. The different part between the present embodiment and the aforesaid embodiment is described hereinafter wherein like elements are referenced by the like numerals. In the present embodiment, the handle portion 11 further has a grip lever 110 that is arranged at or close to a center of the frame structure and extends outward. It is noted that there has no specific limitation on the length of the grip lever 110, and the length of the grip lever 110 is determined according to the actual needs. In one embodiment, the grip lever 110 is designed to have a length that can be gripped by the user to conveniently operate the collection bag for collecting the feces of pets without crouching. In one embodiment, the carrier plate 10, handle portion 11 and the grip lever 110 are made as one-piece unit. Alternatively, the grip lever 110 is arranged at a position closing to a center of the frame structure and is coupled to a lateral outer surface of the handle portion by a predetermined connection manner, such as a sticking connection manner, a tying connection manner, a nail connection, a clip connection, or a combination thereof.

Please refer to FIGS. 2a-2b and 4a-4b, respectively illustrating appearance of two different embodiments of carrier plate according to the present invention. The shape of the carrier plate 10/30 can be a circular shape, an elliptical shape, a rectangular shape, a polygonal shape, a rhombus shape, a diamond shape or a trapezoidal shape. It is noted that the shape of the carrier plate 10/30 is not limited to the aforesaid shape and can be varied according to the actual needs. In addition, the frame structure of the handle portion 11/31 can be a U-shaped structure, upside down U-shaped structure, or V-shaped structure. It is noted that the shape of the frame structure is not limited to the aforesaid shape and can be varied according to the actual needs.

According to the aforesaid description, the specific positions of the handle portion 11 can define the carrier plate 10 having different shape into a front part 101/301 and a rear part 102/302 wherein the front part 101/301 has a first predetermined length L1/L3 and the rear part 102/302 has a second predetermined length L2/L4 along a specific direction that is an axial direction perpendicular to an virtual line formed by connecting two bottom ends of the handle portion 11 coupled to the carrier plate 10/30. In the present embodiment, the first predetermined length L1/L3 is smaller than the second predetermined length L2/L4.

Since the first predetermined length L1/L3 is smaller than the second predetermined length L2/L4, a gravity center 103/303 of the carrier plate 10/30 is located at the area of the rear part 102. Meanwhile, the distance between the gravity center and two bottom ends are equal to or substantially the same as each other. The location of the gravity center is depending on the shape of the carrier plate 10 as well as the area defined by the front part 101 and the rear part 102, which is not limited to the aforesaid embodiment that the area of the front part 101 is smaller than the area of the rear part 102; therefore, the area is varied according to the shape of the carrier plate 10. In addition, the carrier plates 10/30 in the aforesaid embodiments are uniformly formed by a single material and the carrier plate 10/30 having even thickness so as to allow the user to arrange the collection bag at a position where the two bottom ends of the handle portion 11 are corresponding to the pet's rear legs thereby allowing the feces smoothly falling on the rear part 102/302 of the carrier plate 10/30 when the pets are defecating.

According to the aforesaid description, two corresponding sides on the periphery of the front part 101/301 define a predetermined width W1/W2, which is smaller than a distance between the inner sides of the pet's rear legs. It is noted that the predetermined width W1/W2 is varied with the body size of the pets. For example, if the pet is dog, the predetermined width W1/W2 will be ranged from 10 cm-50 cm. In addition, two corresponding sides of the periphery of the front part 101/301 are respectively formed with a recess or a concave profile so that when the collection bag is arranged between the rear legs of the pet, a free standing space is available for the pets thereby preventing the pets from stepping on the carrier plate 10/30.

Figure 5:
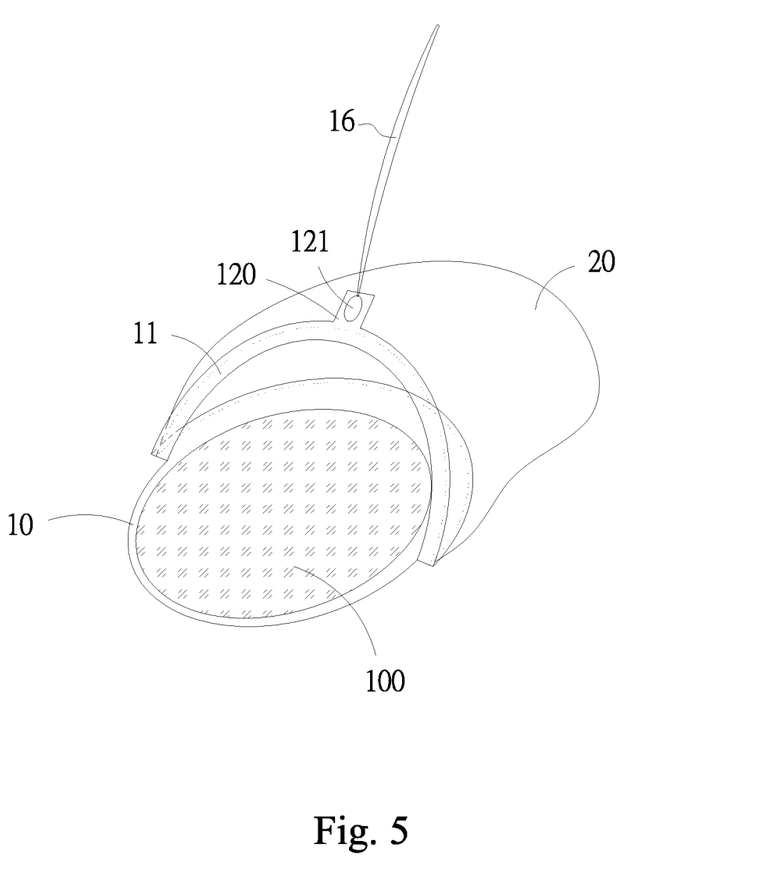
FIG. 5 illustrates another embodiment of a structure of pet feces collection bag according to the present invention.

Please refer to FIG. 5, which illustrates another embodiment according to the present invention. The different part between the present embodiment and the previously described embodiments is explained hereinafter wherein like elements are referenced by the like numerals. In the present embodiment, a connection part 120 having a hole 121 is formed at a center of the frame structure so that a wire rope 16 may be allowed to pass through the hole 121 and be fixed thereon. The wire rope 16 can be a rope with or without elasticity, which is selected according to the actual needs.

In one alternative embodiment, an absorption plate 100 can be further arranged on a surface collecting the feces of the pets, wherein the absorption plate 100 can be made of a material selected from a group consisting of cotton material, wood pulp cellulose, polyester fiber, polypropylene, and a combination thereof. The absorption plate 100 is utilized to absorb the moisture contained in the mushy stool thereby preventing it from expanding outside the carrier plate 10 and contaminating the environment. It is noted that there has no specific limitation on a surface area and the absorption capacity of the absorption material, each of which is selected according to the actual needs. It is noted that the absorption plate 100 can be coupled to the carrier plate 10 by a predetermined connection manner, such as a sticking connection manner, a tying connection manner, a nail connection, a clip connection, or a combination thereof.

Figure 6:
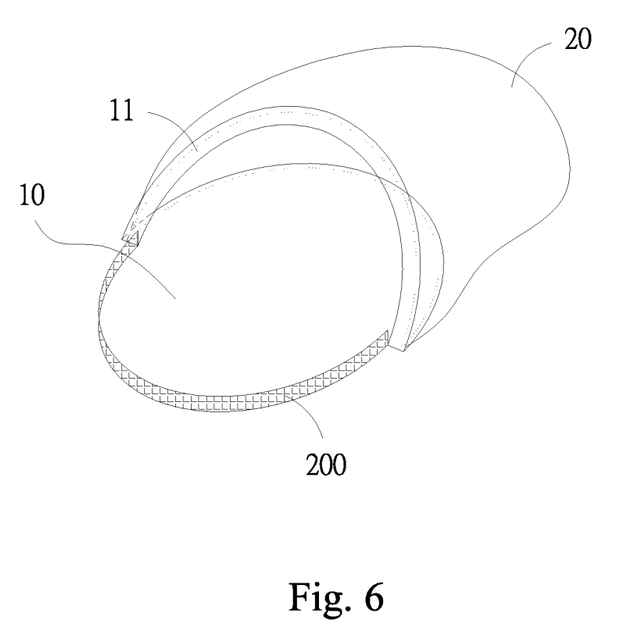
FIG. 6 illustrates another embodiment of a structure of pet feces collection bag according to the present invention.

Please refer to FIG. 6, which illustrates another embodiment according to the present invention. In the present embodiment, the carrier plate 10 further has a blocking part 200 arranged along the periphery of the front part 101. In one embodiment, the blocking part 200 can be a separated element coupled to the periphery of the front part 101. Alternatively, the blocking part 200 and the carrier plate 10 can be formed as one-piece unit, which means that the blocking part 200 is an extending part of the carrier plate 10. An angle defined between the surface of the carrier plate 10 and the blocking part 200 is an included angle, a right angle or an obtuse angle while a length of the blocking part 200 along a long side direction is smaller or equal to a length of the periphery of the front part. It is noted that the aforesaid angle and length of the blocking part 200 is determined according to the actual need, and are not limited to the disclosure of the present embodiment.

Although the invention has been described hereinabove with reference to specific embodiments, each embodiment is not limited to the illustrated drawing and it is applicable to combine between the aforesaid embodiments according to the actual needs. Therefore, it will not be limited to the disclosure of single embodiment described hereinabove.

Figure 3A:
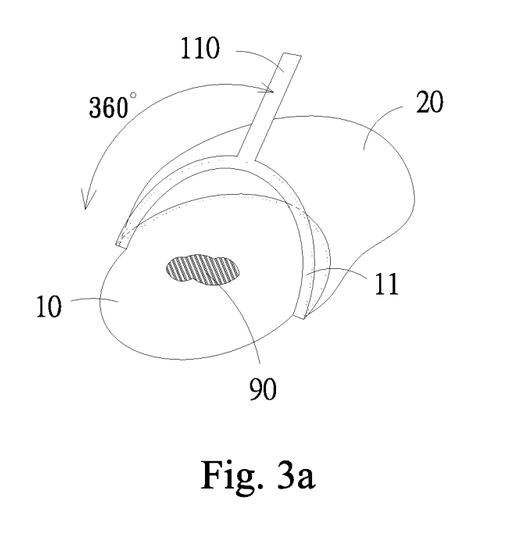
FIGS. 3a to 3b illustrates an application of the collection bag according to one embodiment of the present invention.
Figure 3B:
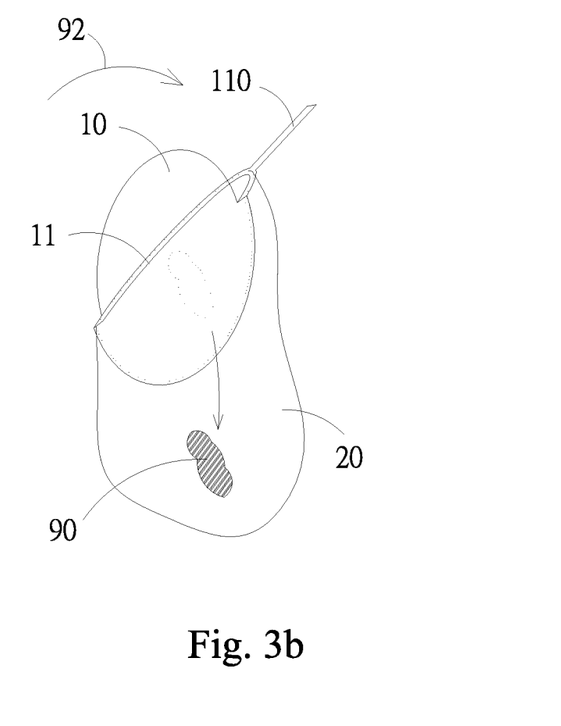
Figure 4A:
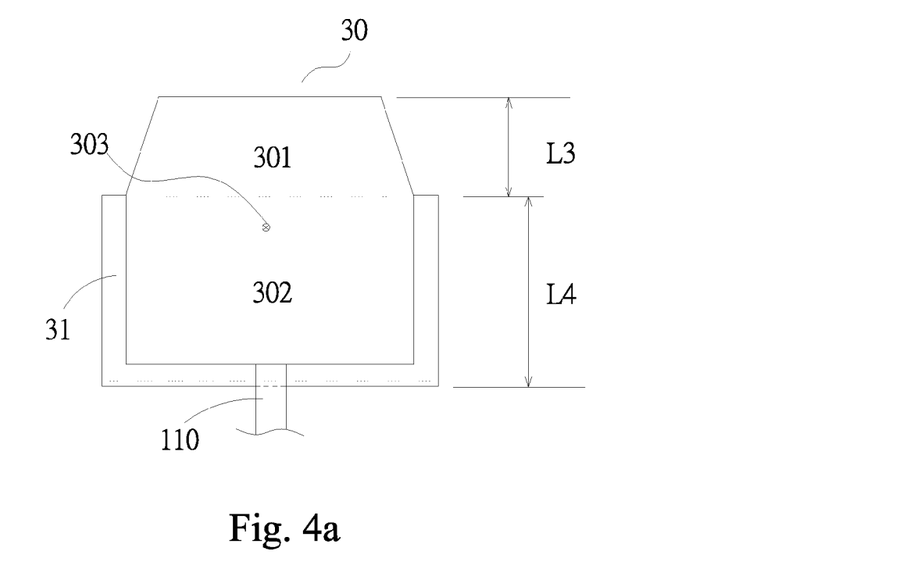
FIGS. 4a-4b illustrates a top view of the opening status and the closing status of the collection bag according to another embodiment of the present invention.
Figure 4B:
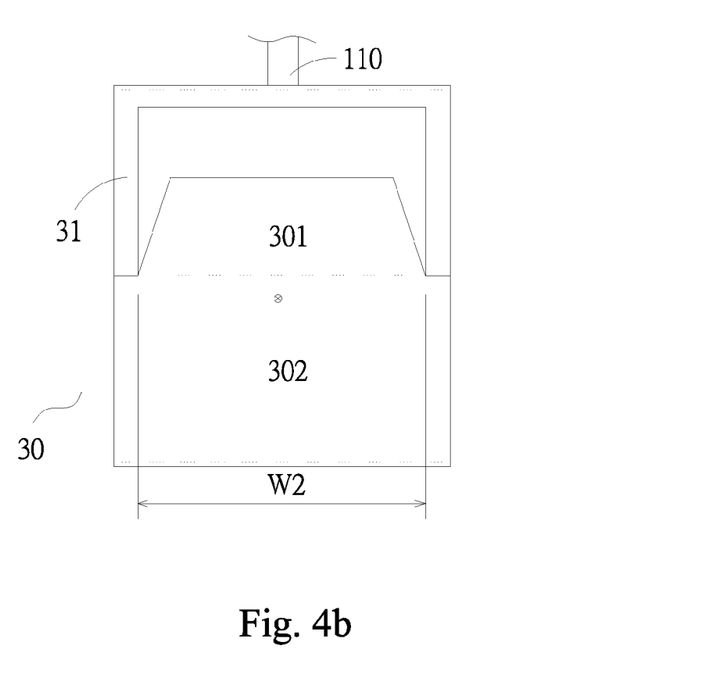

Please refer to FIGS. 3a-3b, the handle portion 11/31 can be operated by a predetermined action by which the handle portion 11/31 is rotated about a specific axis so that the handle portion can rotate around the carrier plate 10/30 within 360 degrees whereby the opening of the bag is adapted selectively to be opened or closed in response to the predetermined action of the handle portion 11/13, wherein the specific axis has an specific axial direction perpendicular to the specific direction.

When the pet is defecating, the user can arrange the collection bag of the present invention between the pet's rear legs whereby the front part 101/301 of the carrier plate 10 is arranged at the position under the body part of the pet so that the rear part 102/302 can collect the feces 90. If the pet moves during the defecation, the user can grip the grip lever 110 to control position of the carrier plate 10/30 so that the carrier plate 10/30 can be moved following the movement of the pet whereby the feces from the pet can fall smoothly onto the rear part 102/302 of the carrier plate 10/30. After that, the user operates the handle portion 11/31 or grips lever 110 or, alternatively, pulls up the wire rope, whereby the handle portion 11/31 exerts an action force on the carrier plate 10 for generating a torque thereby driving the carrier plate 10 to rotate about the specific axis along the specific axial direction so as to make the feces fall into the collection bag 20 and finish the clean treatment of the pet feces.

Since the weight of the pet feces is varied with the type of pets, the principle of the present invention is to make the handle portion 11/31 coupled to the carrier plate 10/30 at a specific positions thereby biasing the gravity center of the carrier plate 10/30 from the specific axis such that the torque for inducing the rotation can be generated by the weight of the carrier plate 10/30 or weight of carrier plate 10/30 and pet feces on the carrier plate when the handle portion 11/31 is pull up by an action force thereby driving the carrier plate 10/30 to rotate toward a predetermined direction 92, such as counterclockwise or clockwise direction, for example. On the other hand, since the amount of feces of dogs having larger body size will be more and heavier, the coupling part, e.g., point contact, between the handle portion 11/31 and carrier plate 10/30 will be the critical part to sustain the total weight of the collection bag when the carrier plate 10/30 is pulled up. Accordingly, measures for increasing the area of the coupling part between the handle portion 11/31 and carrier plate 10/30 is adapted to enhance the tensile strength of the coupling part, which are listed in the following:

A. increasing a thickness of the carrier plate and the handle portion;
B. changing from point contact to area contact; and
C. increasing the length T defined from an inner point to the outer point where the handle portion coupled to the carrier plate shown in FIG. 1a.

In addition, the structure strength of the carrier plate 10/30 is relevant to whether or not the carrier plate 10/30 carrying the feces can rotate toward the predetermined direction thereby allowing the feces to fall into the bag 20. For example, when the carrier plate 10/30 is made of paper material, such as corrugated paper, it is necessary to consider the grain direction, i.e., the direction that most fibers lying. The grain direction is relevant to the flexibility of paper, curl of paper and anti-tear capability of paper. The grain direction of the carrier plate 10/30 is perpendicular to the virtual line formed by connecting two bottom ends of the handle portion 11 coupled to the carrier plate 10/30, i.e. parallel to the specific direction, so as to prevent a curl from being occurred due to the temperature, moisture, or weight bearing thereby preventing the feces from falling outside the carrier plate 10/30 due to the direction of the rotation that is inverse to the predetermined rotation direction, preventing the carrier plate 10/30 from being contracted and extended along the specific direction as well as improving the anti-tear capability of the coupling part between the carrier-plate 10/30 and the handle portion 11/31.

In addition, when the carrier plate is made of kraft paper either waterproof or non-waterproof, it is necessary to consider the basis weight (P). It is noted that the thickness of the kraft paper is related to the basis weight; therefore, if the basis weight of selected kraft paper is too low, the stiffness is insufficient thereby causing the kraft paper becoming soft whereas if the basis weight of the selected kraft paper is too high, the handle portion 11/31 can't move freely due to a large thickness of the kraft paper such that the weight of the pet feces on the carrier plate is insufficient to make the carrier plate 10/30 rotate toward the predetermined direction 92 so that the pet feces can't fall into the bag coupled to the carrier plate 10/30 smoothly. In addition, the selection of the basis weight (P) for making the carrier plate and handle portion is determined according to the size of the bag corresponding to the body size of the pet or dog. According to the above-mentioned conditions, in one embodiment, the basis weight (P) may be larger than 200 P. In one preferred embodiment, the basis weight is in a range from 250~350 P.

Figure 7:
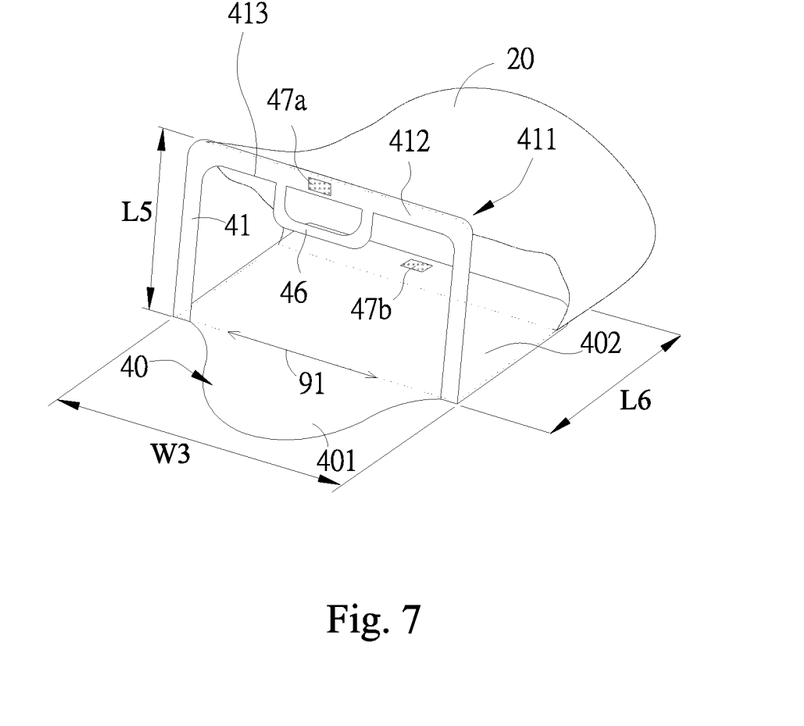
FIG. 7 illustrates an alternative embodiment of the collection bag according to the present invention.

Please refer to FIG. 7, which illustrates another embodiment of the structure of the pet feces collection bag according to the present invention. The present embodiment is an exemplary demonstration for the medium-sized dog wherein the structure comprises a carrier plate 40, and a bag 20. The carrier plate 40 has a handle portion 41 arranged at two specific positions respectively located at two corresponding sides of a periphery of the carrier plate 40. In addition, the carrier plate 40 is defined to have a front part 401 and a rear part 402 wherein the length of each part along the specific direction is the same as the characteristics of the front part and rear part described in the embodiments shown in FIGS. 2a~2b as well as FIGS. 4a and 4b. In the present embodiment, the outer periphery of the front part 401 has an arc-shaped profile while the rear part 402 has a rectangle-shaped plate with chamfers formed at the outer corner of the rear part 402. In the present invention, the carrier plate 40 and the handle portion 41 are integrally formed as one-piece unit.

In the embodiment shown in FIG. 7, the material for making the carrier plate 40 is a waterproof kraft paper having 250 P. In addition, an arm part of the handle portion 41 has a length L5 and the rear part 402 of the carrier plate 40 has a length L6, wherein a total length, defined by summing length L5 and length L6, is in a range from 20 cm~30 cm. The carrier plate 40 also has a width W3 which is defined as a largest dimension of the carrier plate 40 and is the same as the aforesaid predetermined width W1 or W2. In the present embodiment, the width W3 is in a range from 15 cm~20 cm. A dimension ratio K of the total length L5+L6 to width W3 is around 1~2:1. In one preferred embodiment the dimension ratio K is about 1.5:1. It is noted that the dimension ratio K may have a tolerance. For example, 1.41~1.49:1 or 1.51~1.59:1 can be regarded as 1.5:1. The aforesaid tolerance is an exemplary demonstration which is not limited to the exemplary value shown above.

The bag 20 shown in FIG. 7 has an opening coupled to the outer periphery of the rear part 402 of the carrier plate 40 and a periphery of a first surface 411 of the handle portion 41. The handle portion 41 further comprises a grip portion 46 arranged at an inner rim 413 of the handle portion 41, wherein the grip portion 46 is a frame structure extending outward from the inner rim 413 of the handle portion 41. The frame structure can be, but is not limited to, a U-shaped structure, and an upside down U-shaped structure, wherein the width of the frame structure of the grip portion 46 can be determined according to a certain number of fingers wide of the user such as two to four fingers wide, for example. In one preferred embodiment, the width of the grip portion 46 can be, but is not limited to, in a range of 7 cm-12 cm. Furthermore, the handle portion 41 and the grip portion 46 are both foldable to freely rotate about an axis (not shown) that is parallel to the specific axis 91 within 360 degree. In addition, an engaging manner is utilized to engage the handle portion 41 to the carrier plate 40. In one embodiment of the engaging manner, a second surface 412 of the handle portion 41 further has a first engaging element 47a which can stick to a surface of the carrier plate 40 opposite to the surface for receiving the pet feces when the handle portion 41 is rotated to abut against the carrier plate 40. In another embodiment of the engaging manner, in addition to the first engaging element 47a, the surface opposite to the surface for receiving the pet feces further has a second engaging element 47b. In the present embodiment, the first and second engaging elements 47a and 47b are Velcro pads. Since the length L6 of the rear part 402 is nearly the same as the arm length L5 of the handle portion 41 so the first engaging element 47a can be engaged with the second engaging element 47b after the handle portion 41 is folded to abut against the carrier plate 40. It is noted that the user can choose an appropriate way according to the actual need for engaging the handle portion 41 to the carrier plate 40 when the handle portion 41 is rotated to abut against the carrier plate 40.

Figure 8:
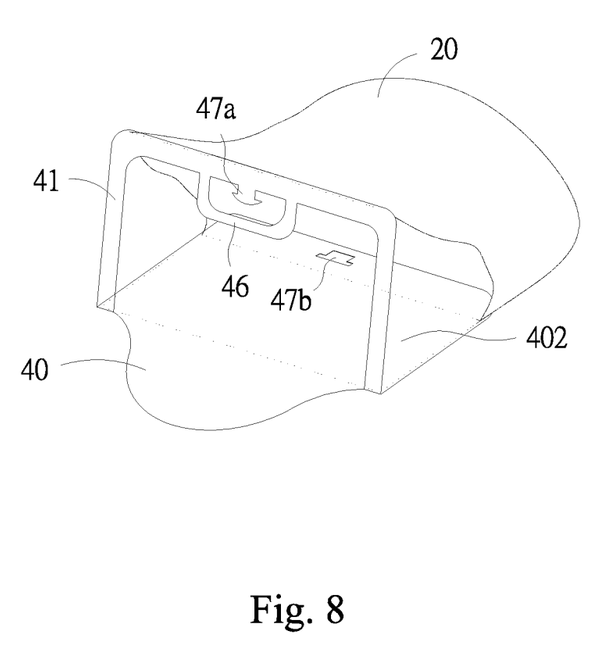
FIG. 8 illustrates one embodiment of the engagement of the first and second engagement element.

Please refer to FIG. 8, which illustrates another embodiment of the first and second engaging elements. In the present embodiment, the structure of the pet feces collection bag comprises a carrier plate 40, a handle portion 41, a grip portion 46, and a bag 20, which are similar to the embodiment shown in FIG. 7, whereas the different part from the embodiment shown in FIG. 7 is the engaging manner using a fastening structure. In the present embodiment, the fastening structure has a first engaging element 47a and a second coupling 47b, wherein, unlike the embodiment shown in FIG. 7, the first engaging element 47a is not arranged at the second surface 412. Instead, the first coupling 47a is a hook structure extending outward from the inner rim of the handle portion 41 whereas the second engaging element 47b is a slot formed on the carrier plate 40. The slot can be formed to penetrate the carrier plate 40 or be formed on the carrier plate 40 without penetrating the carrier plate 40, either of which is determined according to the actual need. In the present embodiment, the first engaging element 47a can be inserted into the second engaging element 47b whereby the hook part of the first engaging element 47a abuts against the surface around the slot so that the handle portion 41 is engaged with the carrier plate 40 when the handle portion 41 is rotated to abut against the carrier plate 40.

Figure 9A:
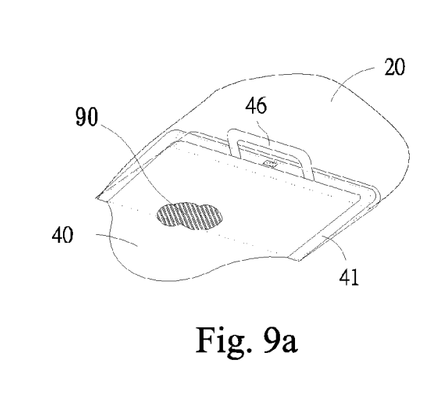
FIGS. 9a-9d illustrate operation steps for collection of pet feces according to one embodiment of the present invention.
Figure 9B:
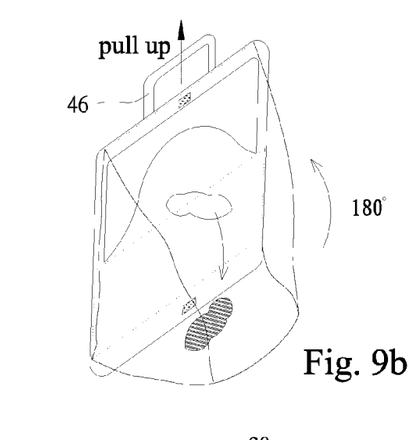
Figure 9C:
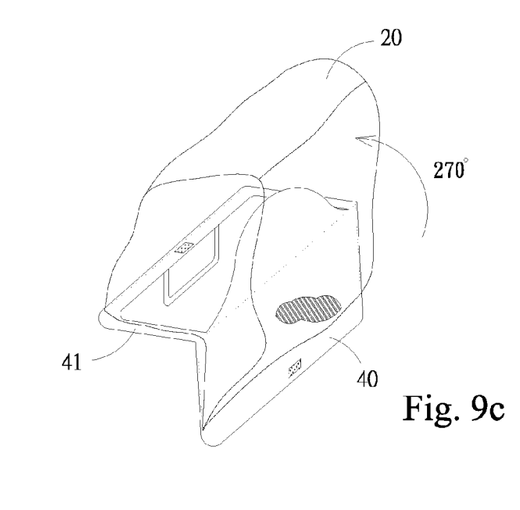
Figure 9D:
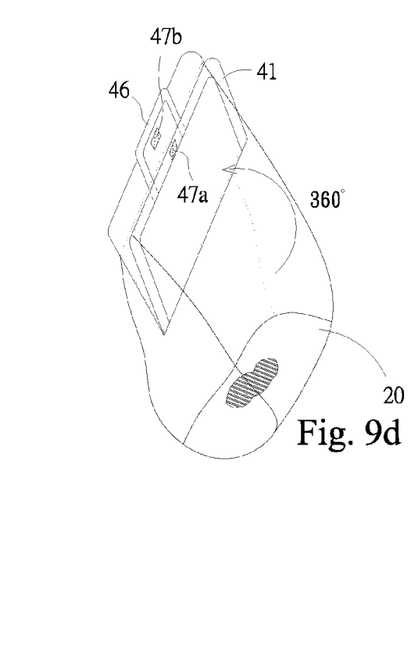

Please refer to FIG. 7 and FIGS. 9a-9d, which illustrate an operation of the pet feces collection bag according to the embodiment shown in FIG. 7. When the pet is defecating, as shown in FIG. 9a, the pet owner can press the handle portion 41 to close the surface of the carrier plate 40, and fold the grip portion 46 upward. Next, as shown in FIG. 9b, when the feces falls on the carrier plate 40, the pet owner pulls up the grip portion 46 such that the handle portion 41 rotates around 180 degrees about the specific axial whereby the feces will fall into the bag 20 due to the gravity. After that, as shown in FIGS. 9c-9d, the handle portion 41 can be operated to continue rotating about the specific axis from 180 to 360 degrees such that the first engaging element 47a is engaged to the second engaging element 47b thereby completing the pet feces collection operation. After the pet feces collection, the pet owner can hold the grip portion 46 and throws the used bag to the garbage can. In one embodiment, the bag is preferably made of opaque to avoid uncomfortable sensation when people see the bag with feces.

According to the aforesaid embodiments, the structure of the pet feces collection bag can be integrally formed as one-piece unit such that the carrier plate carrying the pet feces can rotate toward the grip lever through a pull-up action on the grip lever whereby the pet feces can fall smoothly from the carrier plate to the bag so as to finish the clean treatment of the pet feces. Since the structure of the pet feces collection bag is simple and the size of carrier plate can be designed according to the body size of the pets, the manufacturing cost is extremely low and is suitable for mass production. Meanwhile, the dimension of the collection bag can be varied in accordance with the body size of pets, and the collection bag of the present invention can be a disposable design that may provide alternative choice for users; therefore, the structure of the present invention provides a great advantage that the user can conveniently carry and use the collection bag for collecting the pet feces.

While the present invention has been particularly shown and described with reference to a preferred embodiment, it will be understood by those skilled in the art that various changes in form and detail may be without departing from the spirit and scope of the present invention.

What is claimed is:

1. A pet feces collection bag, comprising:
   a carrier plate;
   a handle portion, coupled to two specific positions respectively located at two corresponding sides of a periphery of the carrier plate so as to define the carrier plate into a front part having a first predetermined length and a rear part having a second predetermined length along a specific direction, the handle portion formed as a frame structure extending outward from the two corresponding positions, wherein the first predetermined length is smaller than the second predetermined length;
   a grip portion which is a frame structure extending outward from an inner rim of the handle portion;
   a bag, configured to have an opening connected to the handle portion and the rear part of the carrier plate along peripheries of the handle portion and the rear part of the carrier plate by a predetermined connection manner, and the predetermined connection manner is selected from a group consisting of a sticking connection manner, a tying connection manner, a nail connection, a clip connection, and a combination thereof;
   wherein, the handle portion is operated through a predetermined action which makes the handle portion to rotate about a specific axis so that the handle portion is rotated around the carrier plate within 360 degrees whereby the opening of the bag is selectively to be opened or closed in response to the predetermined action of the handle portion, and the grip portion is rotated within 360 degrees about an axis parallel to the specific axis.

2. The bag of claim 1, wherein the handle portion further comprises a first engaging element, the carrier plate further comprises a second engaging element, and the first engaging element is engaged to the second engaging element through an engaging manner, and the engaging manner between the first and second engaging elements is a fastening structure.

3. The bag of claim 1, wherein the handle portion further comprises a first engaging element, the carrier plate further comprises a second engaging element, and the first engaging element is engaged to the second engaging element through an engaging manner, and the engaging manner between the first and second engaging elements is a sticking structure.

4. The bag of the claim 1, wherein the frame structure of the handle portion further has a connection part arranged at a position close to a center of the frame structure of the handle portion, wherein the connection part has a hole allowing a rope passing therethrough and the carrier plate, the handle portion, as well as the connection part are formed as one-piece unit.

5. The bag of the claim 1, wherein the handle portion further has a grip lever being arranged at a position close to a center of the frame structure and extending outward, wherein the carrier, the handle portion, and the grip lever are formed as one-piece unit.

6. The bag of claim 1, wherein a grip lever is arranged at a position close to a center of the frame structure and is coupled to a lateral outer surface of the handle portion by the predetermined connection manner.

7. The bag of claim 1, further comprising an absorption plate attached at a lateral surface of the carrier plate by the predetermined connection manner.

8. The bag of the claim 7, wherein the absorption plate is made from a material selected from a group consisting of cotton material, wood pulp cellulose, polyester fiber, polypropylene, and a combination thereof.

9. The bag of the claim 1, further comprising a blocking part coupled to a periphery of the front part wherein an angle between the blocking part and a surface of the carrier plate is an included angle, a right angle or an obtuse angle while a length of the blocking part along a long side direction is smaller or equal to a length of the periphery of the front part.

10. The bag of the claim 1, wherein a predetermined width defined between the two specific positions on a periphery of the front part is ranged from 10 cm to 50 cm.

11. The bag of claim 1, wherein the two corresponding sides of the periphery of the front part of the carrier plate respectively have a recess or a concave profile formed at an area close to the handle portion.

12. The bag of claim 1, wherein a shape of the carrier plate is a circular shape, an elliptical shape, a rectangular shape, a polygonal shape, or a trapezoidal shape.

13. The bag of the claim 1, wherein the frame structure of the handle portion is a U-shaped structure, an upside down U-shaped structure, or V-shaped structure.

14. The bag of the claim 1, wherein the frame structure of the grip portion is a U-shaped structure or an upside down U-shaped structure.

15. The bag of claim 1, wherein the carrier plate is made of waterproof kraft paper having a basis weight greater than or equal to 200 P.

16. The bag of claim 1, wherein the carrier plate is made of a paper material having a paper grain direction parallel to the specific direction.

* * * * *